Figure 1:
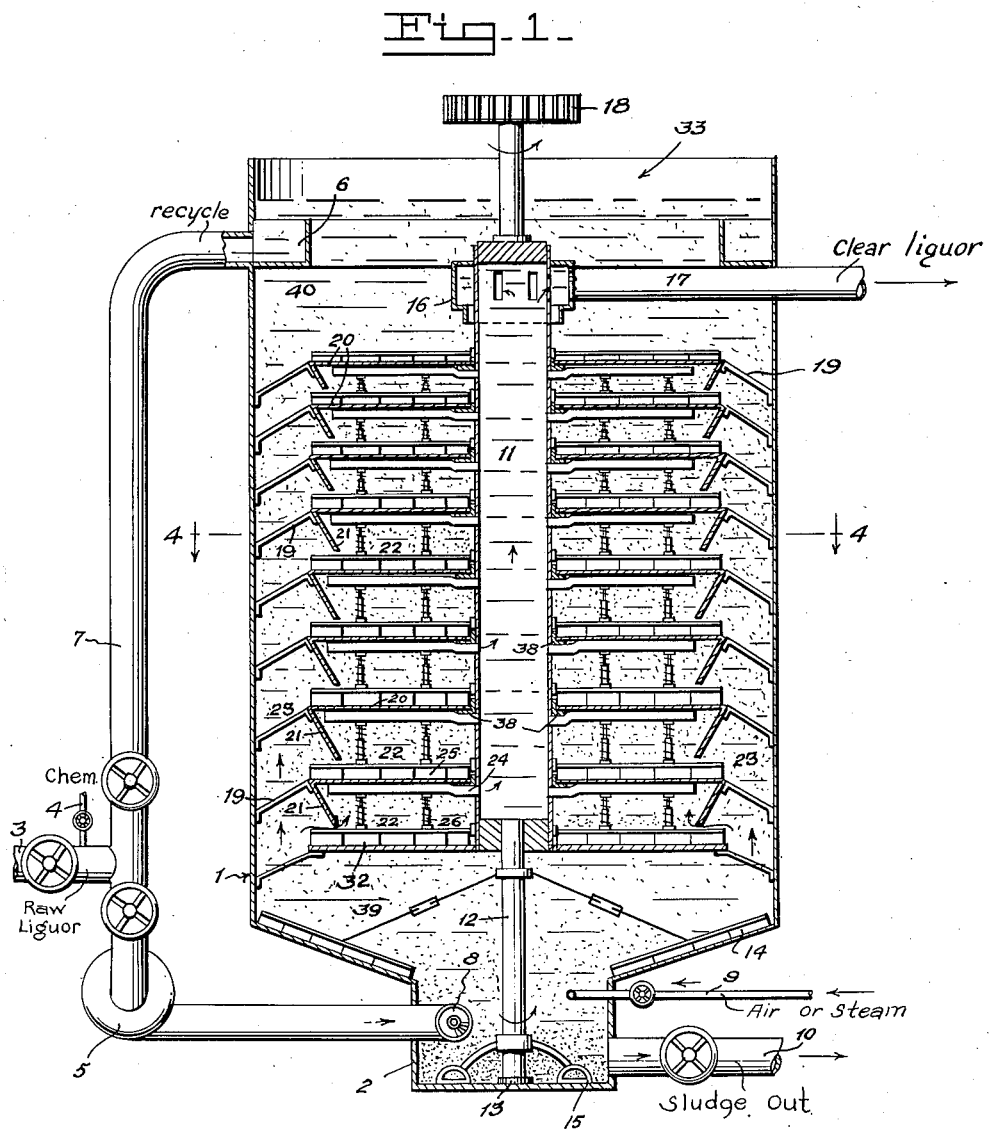

June 14, 1949.     H. C. PARKER     2,473,297
APPARATUS FOR CLARIFYING LIQUORS
Filed April 3, 1945     3 Sheets-Sheet 1

Inventor
Henry C. Parker
By
Attorney

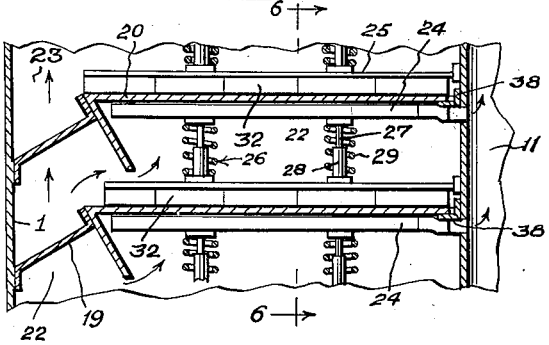
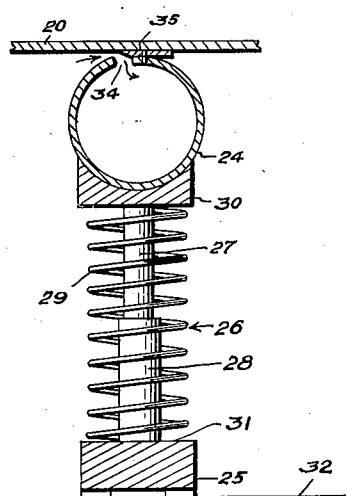
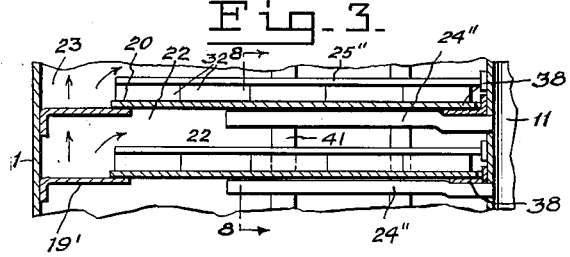
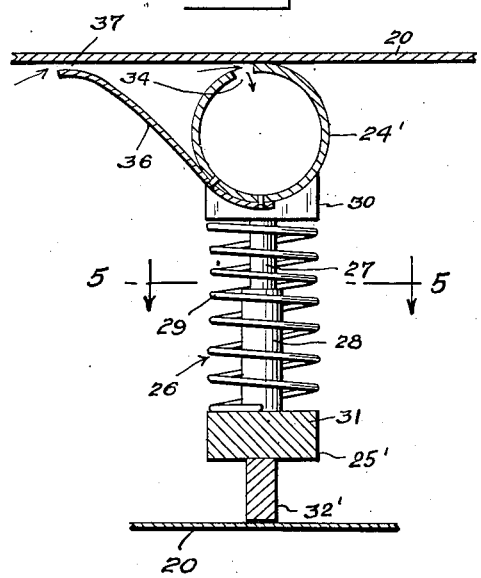
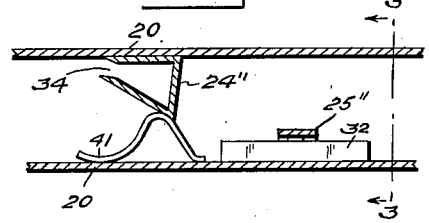

June 14, 1949.  H. C. PARKER  2,473,297
APPARATUS FOR CLARIFYING LIQUORS
Filed April 3, 1945  3 Sheets-Sheet 3

Inventor
Henry C. Parker
Attorney

Patented June 14, 1949

2,473,297

UNITED STATES PATENT OFFICE 2,473,297

APPARATUS FOR CLARIFYING LIQUORS

Henry C. Parker, Washington, D. C.

Application April 3, 1945, Serial No. 586,356

14 Claims. (Cl. 210—55)

This invention relates to apparatus for clarifying liquors; and it comprises a multi-tray clarifier of the type having a plurality of substantially horizontal, superposed trays suspended in the central portion of a tank with depending marginal flanges defining a plurality of central clarifying zones and an outer peripheral passageway for liquor undergoing clarification, a central clear liquor standpipe, means for rotating said standpipe, means attached to said standpipe and rotatable therewith for skimming off a layer or film of clear liquor from substantially the entire cross section of said clarifying zones directly beneath said trays, said skimming means being usually provided with means for holding them in contact with the undersides of said trays, means also attached to said standpipe for scraping precipitated solids from the tops of said trays into said peripheral passageway, means for withdrawing sludge from the bottom of said tank, means for withdrawing clear liquor from said standpipe and means for introducing liquor to be clarified usually at the bottom of said tank, said tank being usually provided with means for recycling liquor from the top to the bottom of said tank and for agitating said liquor sufficiently to produce a suspension of sludge solids extending throughout the tank with the exception of the clarifying zones. The process of this invention comprises the steps of passing a liquor to be clarified, usually mixed with chemicals adapted to produce precipitation of dissolved solids, either into the top or the bottom of a tank which is provided with a plurality of centrally-mounted, closely-spaced, substantially-horizontal trays with peripheral depending flanges defining central superposed clarifying zones and a peripheral passageway for liquor to be clarified, agitating the liquor if necessary to keep the precipitated solids in suspension, passing the suspension through the said peripheral passageway, through passageways provided between said trays and said depending flanges and into the bottoms of said clarifying zones, skimming thin layers of clear liquor from the tops of said clarifying zones directly beneath said trays with rotating skimmers, propelling sludge precipitated on said trays into said peripheral passageway, removing sludge from the bottom of the tank and collecting the clear liquor from said rotating skimmers and removing it from the tank; all as more fully hereinafter set forth and as claimed.

A large number of continuous clarifiers have been developed and employed in the water clarifying art. The first types developed were large units having a single clarifying zone and having a rather small capacity per unit of volume. Most of these clarifiers made use of simple sedimentation of sludge solids. Then multi-tray clarifiers were developed which stepped up the clarifying capacities to some extent, some of these types employing sludge filtration. More recently a so-called rapid flow type of clarifier has been developed in which rapid sedimentation is obtained by mixing the raw liquor to be clarified with recycled sludge solids, sufficient agitation and rate of upflow being provided to produce an agitated suspension of flocculated and partially flocculated sludge solids through which suspension the raw liquor passes on its way to the clear liquor overflow. Multi-tray units of this type have also been suggested. But recently, owing to the shortage of materials, an important demand has developed for small sized units having a still higher capacity per unit of volume. And the types of clarifiers which have been developed previously have not fully met this demand.

I have developed a rather simple clarifier design employing a new principle for drawing off the clear liquor. This principle is particularly adapted for use in the multi-tray type of clarifier and it makes possible a great increase in the number of trays which can be introduced into a tank of a given height. In short this new principle involves skimming off the film of clear liquor which lies in contact with the undersides of the trays, employing rotating skimming arms attached to and discharging into a central clear liquor standpipe, which rotates slowly and which also carries scraper arms which scrape sludge off the tops of the trays. The principle is, however, equally adapted to tanks of rectangular structure, in which case the skimming arms reciprocate beneath the trays.

If the sludge density, that is, the particles per unit of volume in a quiescent liquor undergoing sedimentation, is plotted against the depth of the liquid from its upper surface, at any given short time interval after the liquor has been thoroughly mixed, it will be found that the resulting curve approaches the axis of zero sludge density asymptotically at a point representing the upper surface of the liquor. This means that a film of clear liquor is formed adjacent the upper surface substantially instantaneously after the liquor has been thoroughly mixed with sludge particles. A few seconds after mixing the sludge density increases rapidly from the surface layer downwardly but the clear surface layer increases in depth at a relatively high speed even in the case of relatively thick pulps. Hindered settling and compression are absent adjacent the surface of the liquor. It would thus appear possible, theoretically, to skim off clear liquor at a high rate from the surface of a liquor undergoing sedimentation in a cylindrical tank by means of skimming arms rotating at a rather high rate of speed. I have found that this theoretical result can be substantially achieved provided that the liquor surface is defined by means of a substantially horizontal tray. By the term "substantially horizontal" I mean that the slope of the trays is insufficient to cause any substantial amount of sludge to be discharged therefrom by gravity. I have found that it is not practical to skim a surface film from the top of an open body of water since the surface is not sufficiently quiescent.

In practice I employ rotating skimming arms which are advantageously held resiliently against the undersides of the trays. These arms are hollow and are provided with a longitudinal skimming slot which is held as close as possible against the tray's under surface. It is advantageous to employ wear or bearing strips on the skimming arms to bear against the undersides of the trays and these strips can be made adjustable so as to vary the slot openings. The skimming arms can be made of ordinary pipe stock and the slot can be made by any of the conventional cutting methods. Owing to the fact that clear liquor can be drawn off by my skimming method even though the clear liquor has a depth of considerably less than an inch, it is evident that the depths of the clarifying zones can be greatly reduced in comparison with previously described clarifiers. In fact the trays can be conveniently spaced apart a distance of only 6 inches or less. And surprisingly it is possible to draw off clear liquor from beneath each tray at a rate which is substantially equal to that obtained from conventional clarifying zones. The clarifying capacity per cubic foot of space can therefore be multiplied several times.

It is usually advantageous to employ trays with depending peripheral flanges beneath which the liquor entering the clarifying zones is forced to pass. These depending flanges are also advantageously slanted inwardly at their lower ends in order to prevent the liquor which passes inwardly beneath them from being deflected upwardly adjacent the inner surfaces thereof, thereby producing "boil ups." These depending flanges can be omitted if the skimming arms are shortened so that they do not extend to the peripheral edges of the trays. The use of shortened skimming arms reduces the capacity per arm but this can be compensated for by spacing the trays still closer together in this modification. Since the cost of the depending flanges is eliminated the over-all cost is not increased by the additional trays which, in this embodiment can approach a spacing of about 2 inches. The scraper arms, of course, must extend substantially to the margins of the trays.

It is evident from what has been said above that my new clarifier can be made very compactly and that its capacity is preferably increased by increase of its height rather than its diameter. In fact my design is not adapted to tanks of large diameters. Tanks having diameters of from about 3 to 10 feet are the most practical. But these can be of almost any desired height in order to produce the desired capacity. My clarifiers therefore are of the nature of clarifying standpipes occupying only small floor space. And the clarifying zones are of the nature of clarifying cells rather than resembling the deep clarifying zones of the conventional clarifiers.

Owing to the fact that my skimming pipes are relatively short no difficulties are encountered in securing them to a central rotating standpipe. Usually it is only necessary to provide a boss on the standpipe with a hole which is tapped to receive the pipe threads. But special mountings can be provided if required. It is convenient to mount the skimming pipes directly above the scraper arms and to connect them with compression springs, in such manner that the skimming pipes are forced resiliently against the undersides of the trays. But it is equally possible to mount the skimming pipes separately and to provide springs which are mounted on the bottoms of the pipes and which bear against the top surfaces of the trays underneath so that the pipes are held against the undersides of the trays.

It is evident that my new clear liquor draw-offs can be employed in the clarifiers which operate on either the straight sedimentation or the rapid clarification principles. The relative increase in clarifying capacity obtained with these draw-offs is greater in the case of the straight sedimentation clarifiers but, since the overall clarifying capacity is substantially greater in the case of rapid flow clarifiers, I usually prefer to construct my clarifiers so that they operate on this principle. This requires the production of an agitated sludge bed of flocculated sludge particles extending substantially throughout the peripheral flow channel of the clarifier outside of the clarifying zones. It usually requires recycling of the liquor undergoing clarification and agitating means to keep the sludge in suspension. The problem of keeping sludge in suspension in my clarifiers is greatly simplified, however, owing to the rapid upward flow of liquor to be clarified through the peripheral flow channel. The raw liquor, usually containing added chemicals adapted to produce precipitation of impurities, may be introduced either into the top or the bottom of the clarifier but I prefer to introduce it into a mixing sump located in the bottom of the tank with a rotary motion which helps in keeping the sludge in suspension. Additional agitating means may be supplied if required. In the case of heavy sludge particles, such as those produced in the lime-soda process, for example, it is usually necessary to recycle liquor from the top of the tank to the bottom and the recycling pump then helps to produce the required agitation. When my clarifier is operating on liquors containing a light flocculant precipitate, such as produced by the addition of alum, for example, recycling is usually not necessary and the raw liquor can be introduced either into the top or the bottom of the tank. Adequate space and sufficient time must be provided for the sludge particles to "ripen" before they reach the peripheral flow channel and the clarifying zones. In some cases it is desirable to provide separate mixing tanks connected with my clarifier in which the clarifying chemicals can be mixed with the raw water and in which the sludge can be substantially "ripened" or partially flocculated before the liquor and sludge is introduced into my clarifier.

Figure 5:
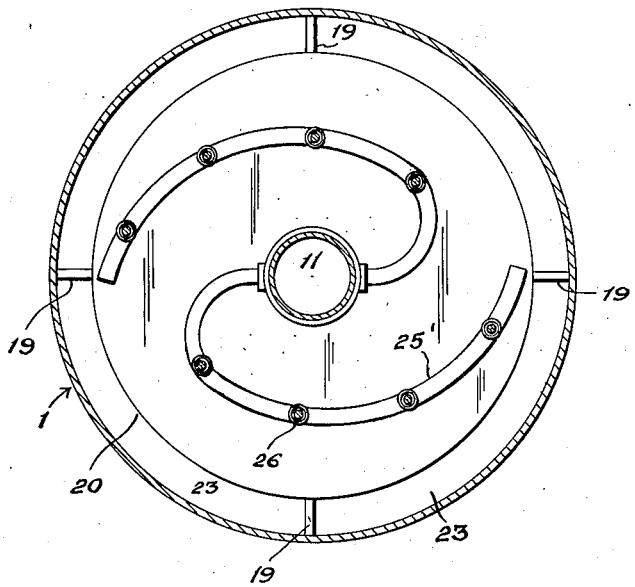
Figure 4:
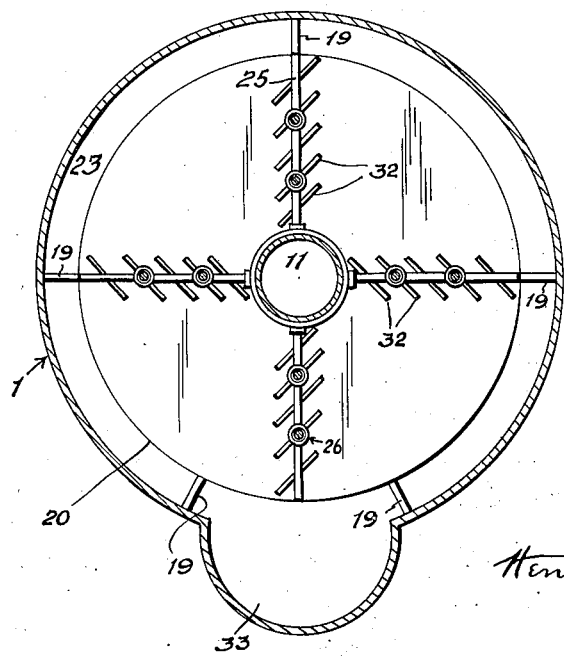

My invention can be explained in more detail by reference to the accompanying drawing which shows, more or less diagrammatically several embodiments of apparatus within the invention and useful in conducting my process. In this showing, Fig. 1 is a central vertical section through my clarifier, Fig. 2 is a partial vertical section on an enlarged scale showing the construction in more detail, Fig. 3 is a similar partial vertical section of a modification, the section being taken along the line 3—3 of Fig. 8, Fig. 4 is a horizontal section, taken along the line 4—4 of Fig. 1, Fig. 5 is a similar section of a modification, taken along the line 5—5 of Fig. 7, Fig. 6 is a partial vertical section through one of my skimming pipes and a connected scraper arm, taken along the line 6—6 of Fig. 2, Fig. 7 is a similar view of a modification, and Fig. 8 is a similar view of the modification of Fig. 3, taken along the line 8—8 of this figure.

In the various figures like parts are designated by like reference numerals. Referring particularly to Figs. 1 to 3, my clarifier comprises a tank shown generally at 1, usually having a mixing sump 2 at the bottom. The raw liquor is introduced through a raw liquor pipe 3 and chemicals through the pipe 4. If recycling is employed the raw liquor and chemicals can be introduced on the suction side of a recycling pump 5 being mixed with recycled liquor collected by the launder 6 at the top of the tank and passing through the recycle pipe 7, the resulting mixture being introduced into the mixing sump tangentially through a nozzle 8. Compressed air or steam can be introduced into the mixing sump for agitating purposes, if desired, through the pipe 9. Sludge is removed from the bottom of the sump by means of the pipe 10. Mounted centrally in the tank is the clear liquor standpipe 11. This is supported at the bottom by means of a shaft 12 and bearing 13. The shaft operates scraper arms 14 which scrape sludge precipitated on the bottom of the tank into the sump and also scrapers 15 which agitate the sludge in the bottom of the sump. At the top the clear liquor standpipe is enclosed by a draw-off jacket 16 which in turn is connected with the clear liquor draw-off pipe 17. The standpipe is rotated by means of a top gear 18. Centrally mounted in the tank by means of outer brackets 19 and inner bearing flanges 38 are a plurality of superposed trays 20 having depending flanges 21 which are advantageously slanted inwardly at their bottoms as shown, and which form superposed clarifying zones or cells 22. These zones may be constructed in such fashion that they increase in depth downwardly, as shown in Fig. 1 although this is usually not necessary if sufficient agitation is employed to maintain a sludge bed of substantially uniform density extending upwardly through the peripheral flow channel 23 between the tank wall and the depending flanges 21.

Each clarifying zone is provided with skimming pipes 24 for collecting clear liquor and scraper arms 25 for scraping sludge off the tops of the trays into the peripheral flow channel. The scraper arms may be mounted directly beneath the skimming pipes, if desired, and resilient connections shown generally at 26 may be employed between these elements for the purpose of holding the skimming pipes resiliently against the undersides of the tray. Of course these resilient connections are not absolutely necessary but it is highly desirable to employ these or equivalent means for holding the skimming pipes as close as possible to the undersides of the trays. The closer these pipes are held against the trays the greater the clarity of the liquor drawn off and the greater the clarifying capacity of the clarifier.

The structure of the skimming pipes, scraper arms and the connections between them are shown best in Fig. 6. It is evident from this drawing that the resilient connection comprises a rod 27 depending from the skimming pipe 24 which slides in a sleeve 28 mounted on the scraper arm 25. A compression spring 29 surrounds this sliding connection and bears against shoulders 30 and 31, formed on the pipe and the scraper arm, respectively. The scraper arm is connected with scrapers 32 which propel the sludge across the tops of the trays. The slot through which the clear liquor is drawn into the skimming pipe is shown at 34. The opening of this slot is made variable by means of the adjustable wear strip 35 which may be constructed of some type of low-friction material, if desired. It will be noted that the slot 34 tends to skim off a mere film of liquid directly adjacent the underside of the tray.

The showing in Fig. 4 agrees with that of Figs. 1, 2 and 6. In Fig. 4 a cleaning well or sump 33 is shown extending from the top to the bottom of the tank. This well is handy for cleaning small diameter clarifiers after a shut-down, for example. In these clarifiers the peripheral flow channels can be made with a clearance of only from 4 to 6 inches between the tank walls and the trays; hence they are difficult to clean without a cleaning well of this type.

In Figs. 5 and 7 a modified form of skimming pipe 24' and scraper arm 25' is shown. In these showings the slot 34 (Fig. 7) is restricted in effect by means of a streamlined guard 36. This guard is adjustable in order to vary the slot 37 between it and the underside of the tray. The width of the slot 37 controls the quantity of clear liquor flowing into the skimming pipe. The guard helps to prevent liquor to the rear of the skimming pipe from entering the skimming slot. This modification causes less disturbance in the liquor at the top of the clarifying zone and hence the skimming pipe can be rotated faster. The scraper in this embodiment is preferably a single strip of rubber or the like 32' mounted beneath the scraper arm 25'. As shown in Fig. 5 the skimming pipe and scraper are helical in shape and this, together with the streamlining produced by the guard 36, results in a minimum disturbance of sludge throughout the clarifying zone.

In Figs. 3 and 8 a further modification of my invention is shown. In this showing the trays 20 do not have a depending flange and are spaced much more closely. The skimming pipes 24" extend only about ⅔ of the distance from the standpipe to the margins of the trays. These skimming pipes are triangular in cross section and are supported from beneath by springs 41 (Fig. 8) which are curled at both ends and bear against the top surfaces of the trays beneath the skimming pipes, thus holding the pipes resiliently against the undersides of the trays. The scraper arms 25" are mounted independent of but directly behind the skimming pipes, in order that the sludge which is suspended by the passage of the scrapers will have a chance to settle before the skimming pipe passes. The scrapers extend to the margins of the trays.

The operation of my clarifier is believed to be rather obvious from the preceding description.

Referring to Fig. 1, a mixture of recycle liquor, raw liquor and chemicals is introduced tangentially into the mixing sump 2. This produces a rotary motion which extends throughout the mixing space 39 beneath the bottom tray and usually through the peripheral flow channel 23 and into the zone 40 above the top tray. Air or steam can be passed through pipe 9 if the agitation produced by the pump 5 is insufficient. But in any case sufficient agitation is provided to cause the formation of a substantially uniform sludge bed extending from the bottom to the top of the tank. The liquor overflows at the top of the tank into the launder 6 and is recycled to the pump again. As the liquor is passed up through the peripheral flow channel streams are bled off and pass centrally beneath the peripheral flanges 21 and into the clarifying zones 22. Owing to the fact that the solids in the liquor are in the state of incipient flocculation, they tend to precipitate as soon as they reach a quiescent state in the clarifying zones. While the upflow in these zones is high, it is very uniform throughout their cross section owing to use of my rotary skimmers; hence a clear liquor-sludge bed interface is formed usually close to the bottoms of the clarifying zones. The sludge precipitates on the tops of the trays and is scraped into the peripheral flow channel while the clear liquor is drawn off directly beneath the trays by the skimming arms at a high rate. This clear liquor passes into the standpipe from which it is drawn off at the top through pipe 17, while the sludge is drawn off at the bottom through pipe 16.

In order to obtain optimum results with my clarifier the rate at which the clear liquor is drawn off should be controlled rather closely in accordance with the speed of rotation of the skimming arms. The optimum draw-off rate for a given speed of rotation can be roughly calculated if the total cross section S of the skimming slots, as projected in the direction of motion, is known. If this cross section is multiplied by the area A traversed by the slots per minute this product will evidently represent the cubic volume V of liquor which can be drawn off without the production of suction or pressure at the orifices of the skimming slots. In other words $V=SA$. Since the area A is directly proportional to the R. P. M. it is evident that the rate of draw-off should be varied directly with the rate of rotation of the skimming arms, at least for optimum results.

When the liquor is sucked in at the slots by too rapid a draw-off rate there is some danger that sludge particles will be sucked in with the clear liquor. Of course, if zones of clear liquor are present which extend some distance below the slots, no harm is done by a slight suction effect but less disturbance of the liquor is produced by speeding up the rotation of the skimming arms until this suction effect is eliminated. When operated in this manner it can be said that a true skimming action is produced. On the other hand if the clear liquor is drawn off too slowly for the rate of rotation which is being used, a pressure wave is produced in front of the orifices of the skimming pipes which, if too large, tends to agitate liquor. As a rule a slower rate of rotation with the production of a slight suction at the orifices produces better results than too fast a rotation rate.

While I have described what I consider to be the best embodiments of my invention, it is evident, of course, that many modifications can be made in the structures and procedures which have been described without departing from the purview of this invention. As indicated previously, the raw liquor can be introduced into my clarifier either at the top or the bottom i. e. at a point outside the confines of the clarifying zones. My new skimming arms are effective in increasing the clarifying capacity regardless of whether the clarifier as a whole is operated as an ordinary settler, without substantial sludge filtration, or as a rapid flow clarifier employing an agitated sludge bed as a filter medium. As also indicated previously my clarifier can be operated advantageously in connection with a preliminary mixing tank serving to mix the raw liquor with chemicals and to partially "ripen" the sludge particles before the mixture is introduced into my clarifier. In this case the mixing zone 39 at the bottom of the tank, the zone 40 at the top of the tank and the mixing sump 2 can be substantially reduced in volume. The sump can be eliminated, other conventional means being employed to collect and remove the sludge. The trays can be constructed all of the same diameter and spaced equal distances apart or they can be made of smaller diameter and/or spaced greater distances apart towards the bottom of tank, if desired. Auxiliary agitating means can be employed in the tank if necessary to maintain the sludge in suspension. The liquor can be recycled from the top to the bottom or from the bottom to the top of the tank by reversing the pump 5, or recycling can be entirely dispensed with.

The skimming arms of my invention can be varied considerably in size and shape. If desired these pipes can be made streamlined in cross section or a shield or guard can be employed for this purpose. In the clarifiers of larger diameter it is possible to taper the skimming pipes towards their ends to cause less disturbance of liquor as the arms pass therethrough. If maximum clarifying capacity is not required it is possible, of course, to vary the speed of rotation of my skimming arms rather widely. Of course the more skimming arms employed, the smaller the maximum speed of rotation which must be employed and the greater the capacity for a given speed of rotation. In general these arms should be rotated at a rate such that they pass a given point somewhere within the range of about 5 seconds to 1 minute apart. The maximum permissible rate of rotation varies considerably with the type of raw liquor which is being clarified, the width of the skimming slots, the density of the precipitate, the temperature of the liquor etc. If the rate of draw-off is increased the rate of rotation should generally be increased and vice versa.

One way in which my clarifier can be tested and then operated in order to obtain maximum capacity is to gradually increase the rate of rotation of the skimming arms, while keeping the rate of draw-off somewhat below the optimum as estimated by the equation $V=SA$, until a point is reached that the draw-off becomes slightly turbid. This shows that the agitation produced by rotation of the skimming arms is sufficient to disturb the sludge-clear liquor interface. The rate of draw-off should then be increased to agree substantially with that calculated by the formula. This will usually cause the liquor to clear since the pressure wave in front of the skimming slot is reduced by this procedure. If the draw-off still remains turbid, the rate of rotation should then be reduced gradually to the point at which the turbidity disappears.

The number of skimming pipes employed per tray can be varied from one up to six or eight, if desired. Usually four is adequate for all purposes. Increased capacities can be expected with minimum disturbance of the sludge-clear liquor interfaces by employing larger numbers of these pipes. The economical number to employ, however, is seldom more than four to a tray.

The skimming slot opening can be varied to a considerable extent without seriously affecting the operation of my clarifier. For average conditions I have found that the width of the slot can be varied from about $\frac{1}{16}$ to $\frac{3}{8}$ inch. Narrow slots tend to become plugged with sludge to some extent, but this sludge can be ejected from the slots by reversing or quickly changing the rate of flow. In some cases it is advantageous to taper the widths of the slots slightly from the inner ends to their outer ends. The inner ends may be made about $\frac{3}{8}$ inch while the outer ends may be from about $\frac{1}{16}$ to $\frac{1}{8}$ inch, for example. The reason for this is that with some liquors the sludge-clear liquor interfaces tend to be higher towards the margins of the trays, this being closer to the entrance of the raw liquor. In other cases it is advantageous to have the skimming slots operating under the lower trays somewhat narrower than those operating under the upper trays, since the upper clarifying zones usually have the larger capacities.

Other modifications of my invention which fall within the scope of the following claims will be immediately evident to those skilled in this art.

What I claim is:

1. A clear liquor draw-off for clarifiers comprising a tank adapted to hold a liquor to be clarified and equipped with at least one substantially horizontal tray mounted in the body of the tank and partially defining a clarifying zone, with means for introducing a liquor to be clarified at a point outside the confines of said clarifying zone and with means for withdrawing sludge solids therefrom; said draw-off comprising at least one skimming pipe mounted directly beneath said tray and bearing against the underside of said tray, means for moving said pipe beneath said tray, means for holding said pipe against the underside of said tray during its movement, said pipe being provided with an upper longitudinal slot directly adjacent the underside of the tray and facing in the direction of the motion of said pipe so that it comes in contact with and tends to collect a thin quiescent film of clear liquor adjacent the underside of the tray as it is moved along thereunder, and means for discharging the so-collected liquor from said pipe.

2. The draw-offs of claim 1 wherein means mounted between said skimming pipes and the trays therebeneath are provided for holding said skimming pipes resiliently against the undersides of said trays.

3. The draw-offs of claim 1 wherein said slots have widths within the range of about $\frac{1}{16}$ to $\frac{3}{8}$ inch.

4. The draw-offs of claim 1 wherein the said skimming pipes are substantially triangular in cross section and are mounted with one side bearing against the underside of said tray.

5. The draw-offs of claim 1 wherein said skimming pipes are circular in cross section.

6. The draw-offs of claim 1 wherein means are provided for adjusting the widths of said slots.

7. The draw-offs of claim 1 wherein wear strips are mounted at the top of said pipes to bear against the undersides of said trays and to prevent liquor at the rear of said pipes from entering said slots.

8. The draw-offs of claim 1 wherein said skimming pipes are provided with wear strips bearing against the undersides of said trays, said strips being adjustable to vary the openings of said slots.

9. A clarifier comprising a cylindrical tank, a plurality of closely-spaced superposed trays mounted in the tank and serving to define a plurality of clarifying zones, means for passing a liquor to be clarified and any chemicals required to produce clarification into said tank and then into said clarifying zones, a plurality of skimming pipes rotatably mounted in said tank in such manner as to bear against the undersides of said trays, each of said pipes being provided with a longitudinal slot extending through a substantial portion of the top of said clarifying zones directly adjacent the undersides of said trays and facing in the direction of motion of said pipes, said slots being adapted to skim thin films of clear liquor directly adjacent the undersides of said trays, means for rotating said skimming pipes, means for withdrawing from said pipes the clear liquor skimmed by said pipes, and means for withdrawing sludge solids from said tank.

10. The clarifier of claim 9 wherein resilient means mounted between said skimming pipes and the trays therebeneath are provided for holding said skimming pipes and slots in contact with the undersides of said trays.

11. A clarifier for clarifying raw liquors which comprises a cylindrical tank, a plurality of stationary, superposed, substantially-horizontal trays mounted centrally in said tank leaving a peripheral flow channel between the wall of the tank and the margins of said trays and helping to define a plurality of superposed clarifying zones, a central clear-liquor standpipe mounted in said tank, means for rotating said standpipe, a plurality of skimming pipes connected to said standpipe for rotation therewith and mounted directly beneath said trays, said pipes being provided with skimming slots having a width of from about $\frac{1}{16}$ to $\frac{3}{8}$ of an inch positioned directly adjacent the undersides of said trays and adapted to skim off a thin film of liquor from directly beneath said trays, scraper arms also attached to and rotatable with said standpipe, bearing against the upper surfaces of said trays and adapted to scrape sludge deposited on said trays into said flow channel, means for feeding a raw liquor to be clarified into said tank at a point outside the confines of the clarifying zones together with any chemicals required to produce precipitation of impurities, means for removing sludge from said tank and means for removing clear liquor from said standpipe.

12. The clarifier of claim 11 wherein the raw liquor is fed into the bottom of said tank and agitating means are provided in the bottom of the tank adapted and arranged to produce a substantially uniform suspension of sludge solids extending upwardly through the peripheral flow channel substantially to the top of said tank.

13. The clarifier of claim 11 including recycling means, said recycling means being adapted to recycle liquor from the top to the bottom of said tank.

14. The clarifier of claim 11 wherein said raw liquor feeding means is located at the bottom of said tank and comprises a tangentially arranged nozzle in the bottom of said tank adapted to produce a rotary motion in said tank of sufficient velocity to produce a suspension of sludge solids in the bottom of said tank and extending upwardly through said peripheral flow channel substantially to the top of said tank.

HENRY C. PARKER.

REFERENCES CITED

The following references are of record in the file of this patent:

UNITED STATES PATENTS

| Number | Name | Date |
|---|---|---|
| 1,247,979 | McHardy | Nov. 27, 1917 |
| 1,741,187 | Fuqua | Dec. 31, 1929 |
| 1,752,789 | Downes | Apr. 1, 1930 |
| 2,003,357 | Gilchrist | June 4, 1935 |
| 2,103,829 | Seip | Dec. 28, 1937 |
| 2,253,500 | Arango | Aug. 26, 1941 |
| 2,253,878 | Weber | Aug. 26, 1941 |
| 2,263,167 | Dorr et al. | Nov. 18, 1941 |
| 2,294,697 | Seip | Sept. 1, 1942 |
| 2,314,977 | Green | Mar. 30, 1943 |
| 2,347,318 | Gurney | Apr. 25, 1944 |
| 2,353,358 | Prager | July 11, 1944 |
| 2,365,293 | Robinson | Dec. 19, 1944 |

FOREIGN PATENTS

| Number | Country | Date |
|---|---|---|
| 229,521 | Great Britain | Feb. 26, 1925 |
| 362,578 | Great Britain | Dec. 10, 1931 |